United States Patent
Walthinsen et al.

(10) Patent No.: US 11,182,477 B2
(45) Date of Patent: Nov. 23, 2021

(54) SYSTEM ABNORMALITY DETECTION USING SIGNAL FINGERPRINTING

(71) Applicant: Cylance Inc., Irvine, CA (US)

(72) Inventors: Erik Walthinsen, Portland, OR (US); Mark Carey, Worthington, OH (US); Donald Bathurst, Denver, CO (US)

(73) Assignee: Cylance Inc., San Ramon, CA (US)

(*) Notice: Subject to any disclaimer, the term of this patent is extended or adjusted under 35 U.S.C. 154(b) by 193 days.

(21) Appl. No.: 16/399,812

(22) Filed: Apr. 30, 2019

(65) Prior Publication Data

US 2020/0349254 A1  Nov. 5, 2020

(51) Int. Cl.
  *G06F 21/55* (2013.01)
  *H04L 29/06* (2006.01)

(52) U.S. Cl.
  CPC .......... *G06F 21/552* (2013.01); *G06F 21/554* (2013.01); *H04L 63/0263* (2013.01); *G06F 2221/033* (2013.01)

(58) Field of Classification Search
  CPC .......... G06F 21/522; G06F 21/554; G06F 2221/033; H04L 63/0263; H04L 63/1416
  See application file for complete search history.

(56) References Cited

U.S. PATENT DOCUMENTS

| 2007/0178914 | A1 | 8/2007 | Montenegro |
| 2018/0270195 | A1 | 9/2018 | Bathurst et al. |
| 2019/0385057 | A1* | 12/2019 | Litichever ............... G06N 3/08 |

FOREIGN PATENT DOCUMENTS

| EP | 2690827 A2 | 1/2014 |
| WO | 2018/104929 A1 | 6/2018 |

OTHER PUBLICATIONS

Gerdes et al., "Physical-Layer Identification of Wired Ethernet Devices," IEEE Transactions on Information Forensics and Security, 7(4):11339-1353 (2012).
International Patent Application No. PCT/US2020/030257, Written Opinion dated Jul. 10, 2020 (9 pages).
International Patent Application No. PCT/US2020/030257, International Search Report dated Jul. 10, 2020 (5 pages).

* cited by examiner

*Primary Examiner* — Paul E Callahan
(74) *Attorney, Agent, or Firm* — Jones Day (57) ABSTRACT

Systems, methods, and devices are described herein for detecting abnormalities within a system based on signal fingerprinting. A plurality of electrical signals are concurrently received from a transceiver over a time period. The time period is partitioned into a plurality of sampling windows. An electrical signal of the plurality of electrical signals is sequentially selected. For the sequentially selected electrical signal, a temporal snapshot of said electrical signal is iteratively captured over a sampling window of the plurality of sampling windows. This iterative capturing is repeated for remaining sampling windows of the plurality of sampling windows. Each captured temporal snapshot is temporally concatenated over the time period according to its respective temporal position of the time period to generate the signal fingerprint.

20 Claims, 7 Drawing Sheets

SYSTEM ABNORMALITY DETECTION USING SIGNAL FINGERPRINTING

FIELD

The subject matter described herein relates to enhanced techniques for signal fingerprinting to detect abnormalities within systems.

BACKGROUND

With the increase in connectivity and computing capabilities, there is an increase is electronic data storage and transmission. Such storage and transmission can be subject to malicious attacks. Protection against malicious attacks can increase consumer confidence in electronic data storage and transmission, while providing secure means storing and transmitting data.

SUMMARY

Systems, methods, and devices are described herein for detecting abnormalities within a system based on signal fingerprinting. In one aspect, a plurality of electrical signals are concurrently received from a transceiver over a time period. The time period is partitioned into a plurality of sampling windows. An electrical signal of the plurality of electrical signals is sequentially selected. For the sequentially selected electrical signal, a temporal snapshot of said electrical signal is iteratively captured over a sampling window of the plurality of sampling windows. This iterative capturing is repeated for remaining sampling windows of the plurality of sampling windows. Each captured temporal snapshot is temporally concatenated over the time period according to its respective temporal position of the time period to generate the signal fingerprint. The transceiver can be a 10 megabit Ethernet transceiver, 100 megabit Ethernet transceiver, or 1 gigabit Ethernet transceiver.

In some variations, a signal difference between the real-time fingerprint and a predetermined fingerprint of the transceiver can be determined. The signal difference can be compared to a predetermined error threshold. An abnormality in a system including the transceiver can be determined when the signal difference is outside of the predetermined error threshold.

In other variations, the abnormality can be remedied by alerting a user of the system through a message displayed on a graphical user interface.

In some variations, the abnormality can be remedied by implementing a firewall rule that blocks the transceiver from further communication with the system. The firewall rule can prohibit communication by the transceiver with component of the system.

In other variations, the abnormality can be remedied by disabling one or more interfaces to the transceiver to prohibit communication between the transceiver and components of the system.

In some variations, the signal fingerprint characterizes components of the system electrically coupled to the transceiver, the components including at least one of a data cable coupled to the transceiver, one or more data processors coupled to the transceiver, or one or more electrical cables.

In other variations, the plurality of electrical signals include a plurality of voltage signals.

In another aspect, a system comprising includes a transceiver, a fingerprint module, and a memory device. The transceiver is configured to receive data from a communications bus and generate a plurality of electrical signals representing the data. The fingerprint module is coupled to the transceiver. The fingerprint module is configured to receive the plurality of electrical signals and generate a real-time fingerprint of components coupled to the communications bus. The memory device is coupled to the fingerprint module. The memory device is configured to store a baseline fingerprint of the components coupled to the communications bus for comparison with the real-time fingerprint.

In some variations, the fingerprint module generates the real-time fingerprint by concurrently receiving a plurality of electrical signals from a transceiver over a time period. The time period is partitioned into a plurality of sampling windows. An electrical signal of the plurality of electrical signals is sequentially selected. A temporal snapshot of said electrical signal is iteratively captured over a sampling window of the plurality of sampling windows. The iterative capturing is repeated for remaining sampling windows of the plurality of sampling windows. Each captured temporal snapshot over the time period is temporally concatenated according to its respective temporal position of the time period to generate the real-time fingerprint.

In other variations, the system can also include a controller which encompasses the memory device and a controller interface coupled between the controller and the transceiver. The controller interface can be configured to facilitate data transmission between the transceiver and the controller in a compatible data format.

In some variations, the fingerprint module includes a switch, a track and hold component, a converter, a sequencer, and a serial peripheral interface. The switch can be coupled to the transceiver and configured to receive the plurality of electrical signals and select one electrical signal of the plurality of electrical signals. The track and hold component can be coupled to the switch. The track and hold component can be configured to receive the selected electrical signal and pause said selected electrical signal in time. The converter can be coupled to the track and hold component and the sequencer. The converter can be configured to sample the selected electrical signal. The serial peripheral interface (SPI) can be coupled to the sequencer and the converter, the SPI can be configured to transmit the sampled electrical signal. The sequencer can be coupled to the transceiver, the track and hold component, and the switch. The sequencer can be configured to trigger each of the track and hold component and the converter to operate at a moment in time.

In other variations, the transceiver is at least one of a 10 megabit (Mb) Ethernet transceiver, 100 Mb Ethernet transceiver, or 1 gigabit (Gb) Ethernet transceiver.

In yet another aspect, a system can include a communications bus, a first abnormality detection system, and a second abnormality detection system. The communications bus is configured to transmit data. The first abnormality detection system is coupled to the communications bus and is configured to provide data to the communications bus. The second abnormality detection system is also coupled to the communications bus. The second abnormality detection system is configured to monitor the first abnormality detection system by generating a real-time fingerprint of the first abnormality detection system.

In some variations, the second abnormality detection system can generate the real-time fingerprint by concurrently receiving a plurality of electrical signals from a transceiver over a time period. The time period can be partitioned into a plurality of sampling windows. An electrical signal of the plurality of electrical signals can be sequentially selected. A temporal snapshot of said electrical signal can be iteratively captured over a sampling window of the plurality of sampling windows. The iterative capturing can be repeated for remaining sampling windows of the plurality of sampling windows. Each captured temporal snapshot can be temporally concatenated over the time period according to its respective temporal position of the time period to generate the real-time fingerprint.

In other variations, the transceiver is at least one of a 10 megabit (Mb) Ethernet transceiver, 100 Mb Ethernet transceiver, or 1 gigabit (Gb) Ethernet transceiver.

In some variations, the second abnormality detection system includes a transceiver, a fingerprint module, and a memory device. The transceiver can be configured to receive data from a communications bus and generate a plurality of electrical signals representing the data. The fingerprint module can be coupled to the transceiver. The fingerprint module can be configured to receive the plurality of electrical signals and generate a real-time fingerprint of components coupled to the communications bus. The memory device can be coupled to the fingerprint module. The memory device can be configured to store a baseline fingerprint of the components coupled to the communications bus for comparison with the real-time fingerprint.

In other variations, the fingerprint module includes a switch, a track and hold component, a converter, a sequencer, and a serial peripheral interface. The switch can be coupled to the transceiver. The switch can be configured to receive the plurality of electrical signals and select one electrical signal of the plurality of electrical signals. The track and hold component can be coupled to the switch. The track and hold component can be configured to receive the selected electrical signal and pause said selected electrical signal in time. The converter can be coupled to the track and hold component and the sequencer. The converter can be configured to sample the selected electrical signal. The serial peripheral interface can be coupled to the sequencer and the converter. The serial peripheral interface can be configured to transmit the sampled electrical signal. The sequencer can be coupled to the transceiver, the track and hold component, and the switch. The sequencer can be configured to trigger each of the track and hold component and the converter to operate at a moment in time.

The subject matter described herein provides many technical advantages. For example, the current subject matter provides detection of abnormal electrical characteristics of a transceiver component such as voltage characteristics. Upon detection of abnormal characteristics, as described in detail herein, data transmission can be terminated or secured to and/or from the transceiver component. Detection of abnormalities in operation of the transceiver can prevent and/or remedy a potential malicious data attack. Additionally, use of this subject matter can protect data stored within a system having the transceiver component and/or prevent data transmission of data within the system.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to techniques for protecting transceivers and/or communications equipment and networks from alteration or malicious modification, through hardware and software platforms connected to one or more transceivers. A hardware module can be connected to or embedded within a transceiver device, such as an Ethernet or automotive transceiver, whereby creating a point for communications centralization and security posture assessment. Such a platform can provide defensive capabilities such as communications encryption, attack detection and prevention, transceiver fingerprinting and authentication, message modification prevention, message activity recording, and a next-generation firewall. The platform can also provide awareness of an attack or compromise, control communications from the affected transceiver to the network, and defend from compromised transceivers on the network. In addition, the security platform can be used to monitor human-machine interfaces and third-party firmware within a system having a transceiver for integrity and malicious modification, reporting this to the user or external security personnel.

Figure 1:
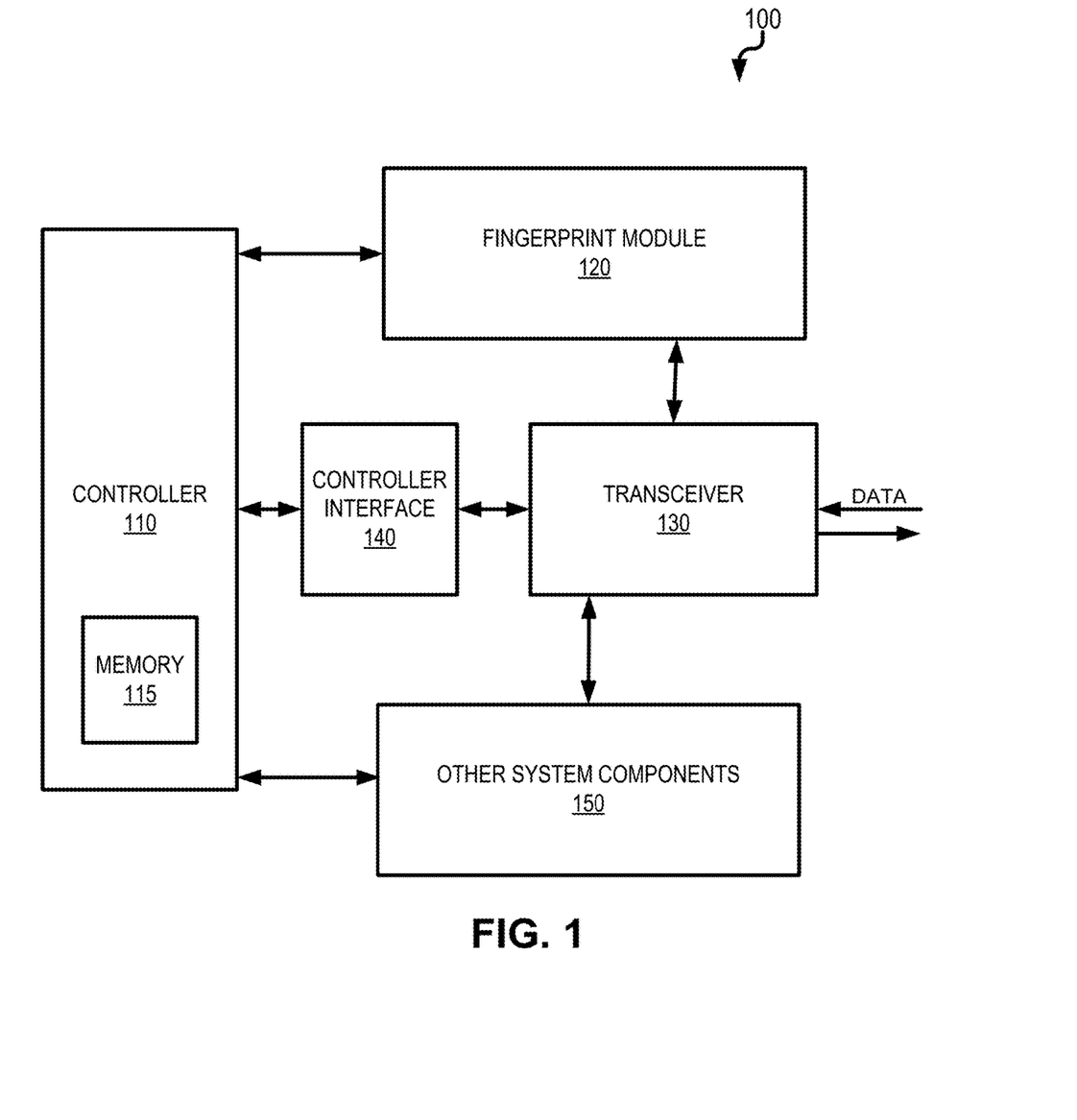
FIG. 1 is an abnormality detection system diagram illustrating an example logical system architecture for signal fingerprinting.

FIG. 1 is an abnormality detection system diagram 100 illustrating an example logical system architecture for signal fingerprinting. In accordance with some variations, the abnormality detection system 100 can include a controller 110, fingerprint module 120, transceiver 130, controller interface 140, and a plurality of other system components 150. Data can be transmitted and/or received by transceiver 130. The data can be transmitted over a wired connection (e.g., an Ethernet connection) such as to a communications bus as described in FIG. 2. Transceiver 130 can be any component having capability to send and/or receive data. For example, in accordance with some aspects and as described in more detail in FIGS. 3-4, based on the system architecture of abnormality detection system 100, transceiver 130 can be a 10 megabit (Mb) transceiver, a 100 Mb transceiver, or a 1 gigabit (Gb) transceiver. Abnormality detection system 100 can also include one or more system components 150 such as, but not limited to, media-independent interface (MII) registers, auto-negotiation policies such as managing differing wire speeds, chip or board level testing systems, clock management components, and/or phase-locked loop (PLL) controllers.

The data received and/or sent by transceiver 130 can be transmitted to and/or from controller 110 via controller interface 140. Controller interface 140 can be configured to facilitate data transmission between transceiver 130 and controller 110 in a compatible data format for both transceiver 130 and controller 110. The data received by transceiver 130 may be encoded in a physical layer. Such data, in order to interface with controller 110, can be encoded by controller interface 140 to be transmittable within a data link layer, such as a medium access control (MAC) layer and/or logical link control (LLC) layer. Controller interface 140 can be, for example, a reduced media-independent interface (RMII), a gigabit media-independent interface (GMII), a reduced gigabit media-independent interface (RGMII), a 10-gigabit media-independent interface (XGMII), a MII, a serial gigabit media-independent interface (SGMII), or any media-independent interface (xMII).

Figure 2:
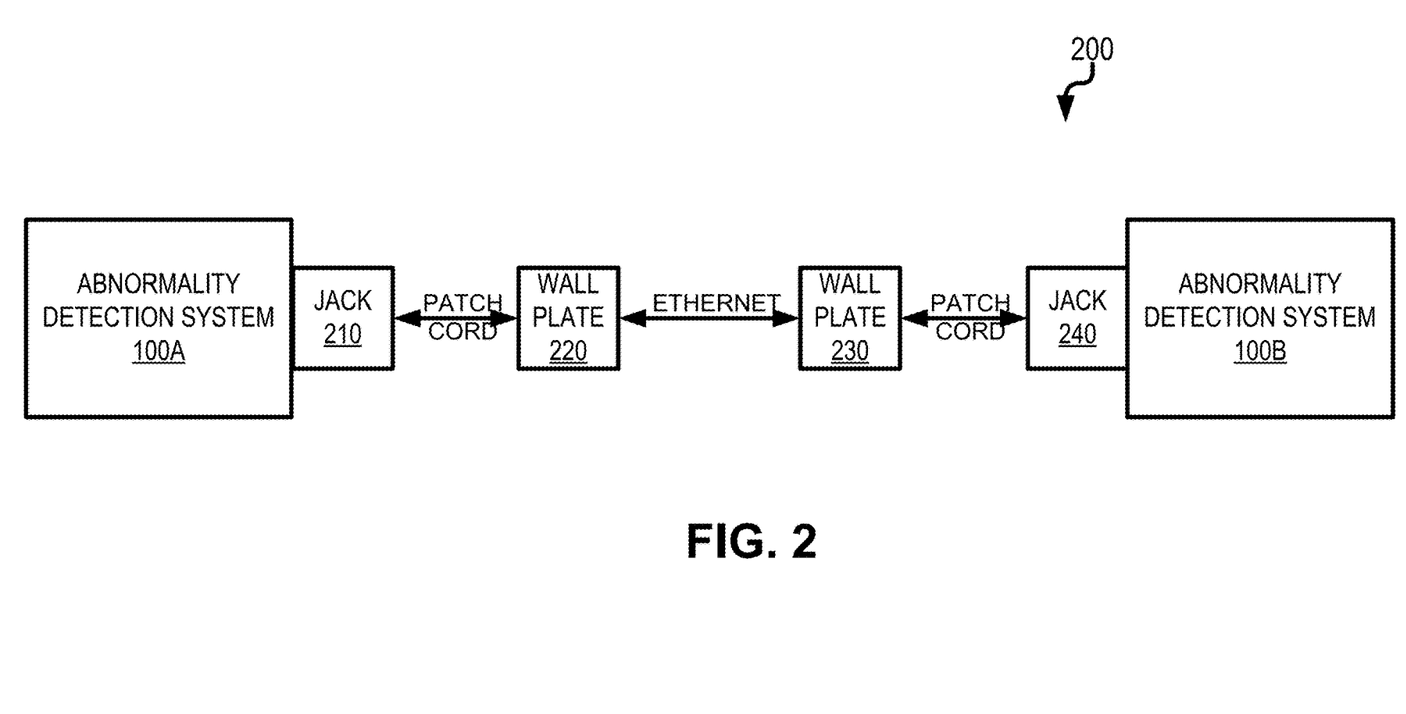
FIG. 2 is an operational system diagram illustrating integration of multiple abnormality detection systems of FIG. 1.

FIG. 2 illustrates an operational system 200 which incorporates two or more abnormality detection systems 100A, 100B. By way of example, each abnormality detection system 100A, 100B, can each have the architecture illustrated in FIGS. 1 and/or 3-4. Operational system 200 can include at least two abnormality detection systems coupled together via jack 210, wall plate 220, wall plate 230, and jack 240. Wall plates 220, 230 can be coupled together via an Ethernet connection capable of transmitting and/or receiving data. Path cords can coupled together the wall plates to a respective jack. For example, a patch cord can couple wall plate 220 to jack 210. Similarly, a patch cord can couple together wall plate 230 and jack 240. One abnormality detection system (e.g., one of 100A, 100B) can detect modification of a transmitting side transceiver/unit of another abnormality detection system. For example, abnormality detection system 100A can detect abnormalities in abnormality detection systems 100B. In this example, abnormality detection system 100A knows the expected signal fingerprint of abnormality detection system 100B. In other words, abnormality detection system 100A determines the baseline signal fingerprint. Additionally, abnormality detection system 100A generates and monitors the real-time fingerprints of abnormality detection system 100B to identify any deviations from that baseline signal fingerprint of abnormality detection systems 100B. At least two abnormality detection systems provide for functionality of detecting abnormalities in operational system 200. Having three or more abnormality detection systems can provide some level of integrity against malicious data attacks or breaches. In accordance with some variations of FIG. 1, fingerprint module 120 can be a hardware module electrically coupled to transceiver 130, as described in more detail in FIGS. 3-4. Modification to aspects of one of the abnormality detection systems 100A, 100B in which transceiver 130 is not a part of, can be detected by fingerprint module 120 monitoring the other abnormality detection systems 100A, 100B. Fingerprint module 120 can operate in at least two operating modes: an imprint mode and a monitoring mode. For illustration purposes, consider the example of abnormality detection system 100 of FIG. 1 as abnormality detection system 100A of FIG. 2. During imprint mode, fingerprint module 120 can capture operational electrical signal characteristics of the transceiver of abnormality detection system 100B such as voltage characteristics. A baseline fingerprint can be generated by fingerprint module 120 for abnormality detection system 100B. The baseline fingerprint is stored within memory for later use (e.g., stored within memory 115). The baseline fingerprint can account for operational signals and various system interferences or influences such as various cable lengths of cables such as data cables coupling system components within abnormality detection system 100B. The baseline signal fingerprint can also account for electrical component tolerances of one or more electrical components within abnormality detection system 100B. During monitoring mode, fingerprint module 120 of abnormality detection system 100A can monitor operational signals of the transceiver in abnormality detection system 100B and generate a real-time fingerprint of the transceiver of abnormality detection system 100B. The generated real-time fingerprint can be compared to the baseline fingerprint (e.g., a predetermined fingerprint) to identify differentials within the fingerprint signals such as voltage differentials. These differentials can be evaluated against an error threshold. For example, an error threshold can be established by a user to define how much signal differential is permissible within abnormality detection system 100B. An abnormality can be identified, for example, if a differential exists between the baseline fingerprint and real-time fingerprint that exceeds the error threshold (e.g., predetermined error threshold). While abnormality detection system 100A is described by way of example, one should appreciate that abnormality detection system 100B can operate in a similar manner to generate a baseline signal fingerprint and monitor the real-time fingerprint of abnormality detection system 100A.

Figure 3:
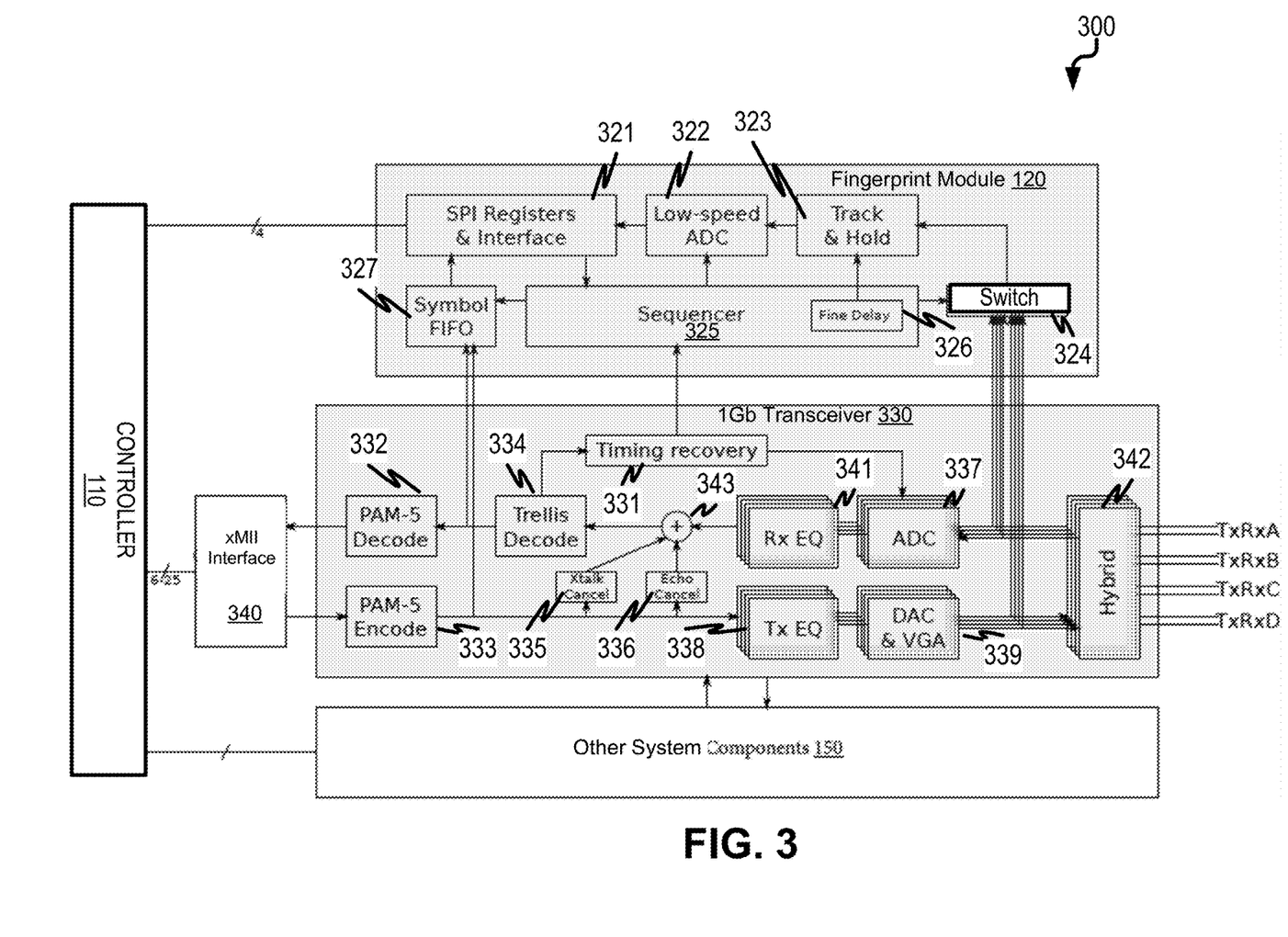
FIG. 3 is a system diagram illustrating another example logical system architecture for signal fingerprinting of a 1 Gb transceiver.

FIG. 3 is a system diagram 300 illustrating another example logical system architecture for signal fingerprinting of a 1 Gb transceiver. Transceiver 130 can be a 1 Gb transceiver, such as transceiver 330. Transceiver 330 can include timing recovery component 331, Pulse Amplitude Modulation 5 levelers (PAM-5) decoder 332, PAM-5 encoder 333, trellis decoder 334, crosstalk (Xtalk) component 335, echo cancel component 336, analog to digital converters (ADC) 337, transmit component Tx EQ 338, digital to analog converter (DAC) and variable gain amplifier (VGA) component 339, receiver component Rx EQ 341, and hybrid components 342. In one variation, an Ethernet cable can be coupled to hybrid components 342 and transmit data, such as an Ethernet having 4 pairs A-D. Hybrid components 342 enable transmit and receive data or signals transmitted along Ethernet cables (e.g., TxRxA-TxRxD) to travel simultaneously in each direction over each pair. The recovered receive signal going to the ADC 337 can be the difference between the signal on the Ethernet cable and the signal being transmitted by the DAC & VGA component 339. The recovered received signal generated by hybrid components 342 can be sampled by ADC 337 to capture a waveform associated with the Ethernet data. The captured waveform generated by ADC 337 can be provided to a multi-tap digital filter (e.g., receiver component Rx EQ 341) in order to compensate for cable conditions such as length or transmission loss. Receiver component Rx EQ 341 can generate a filtered signal. The filter signal can be provided to a summation component 343, along with signals generated by crosstalk component 335 and echo component 336. Summation component 343 can cancel out or remove portions of the filtered signal that contain aspects of crosstalk or echo which were not removed by hybrid components 342. Trellis decoder 334 recovers encoded information that may have been corrupted during data transmission along one or more data cables such as Ethernet cables. Trellis decoder 334 can generate a synchronized data stream (e.g., a PAM-5 symbol stream) to timing recovery component 331 and PAM-5 decoder 332. Timing recover component 331 can use the synchronized data stream to recover a clock matching the far-end transmit clock. Timing recovery can be accomplished several ways, but in general involves looking for transition points in the signal across certain boundaries located halfway between one legitimate value and another.

These transitions should occur halfway between one clock and another. The recovery subsystem measures the temporal offset between the actual transition points and where the transition points should be. Using a proportional-integral-derivative (PID) loop, can incrementally adjust a local clock until the local clock frequency and phase are locked onto the signal being received from the far transmit side transceiver. This clock signal can be fed forward into ADC 337 to align the clock within sequencer 325 and timing recovery components 331. The synchronized data stream can be decoded back into the original data stream and provided to xMII interface 340 using PAM-5 decoder 332. XMII interface 340 ensures the data output from transceiver 330 is compatible with controller 110.

Transceiver 330 can also receive data from controller 110 via xMII interface 340. XMII interface 340 can ensure the data provided to transceiver 330 is compatible with transceiver 330. Data received from xMII interface 340 can be encoded into a PAM-5 symbol stream using PAM-5 encoder 333. The transmitted symbols can be transformed to compensate for expected crosstalk between data transmission cables (e.g., the 4 Ethernet cable pairs TxRxA-TxRxD) within the hybrid components 342 along with an Ethernet jack and cable themselves. The transmitted symbols can also be transformed to compensate for the expected echo return from the far end of the cable, and fed into the summation component 343. The transmitted symbols can also be provided to a multi-tap digital filter (e.g., transmitter component Tx EQ 338) to compensate for cable conditions.

Fingerprint module 120 can monitor operation of other transceivers (as described in detail in FIG. 2) to detect any anomalies external to system 100 such as within the transceiver 330 of the external system 100 or other components coupled to transceiver 330 of external system 100. Fingerprint module 120 can include serial peripheral interface (SPI) registers 321, low-speed ADC 322, track and hold components 323 such as an amplifier, a selector switch 324, a sequencer component 325, and a symbol first-in-first-out (FIFO) component 327. In the example illustrated in FIG. 2, each of the eight signals (e.g., 4 Rx and 4 Tx of TxRxA-TxRxD) from hybrid components 342 can be provide into a selector switch 324. Selector switch 324 can route each signal, one at a time, into the track and hold components 323. In some variations, selector switch 324 can be an 8:1 selector switch or a 2:1 selector switch as described in FIG. 4. Alternatively, selector switch 324 can be any selector switch that facilitates data input from transceiver 130 to fingerprint module 120. Selector switch 324 can be enabled with an extremely high bandwidth (e.g., greater than 10 GHz). Track and hold components 323 receives one signal at a time from selector switch 324. The signal is paused at a specific point in time by the track and hold components 323. Pausing and slicing the signal into the smallest possible unit can determine the upper limit of detail that can be captured by fingerprint module 120. Selector switch input bandwidth is matched to the track & hold component's 323 bandwidth and can be set to a level sufficient enough to capture any signal nuances (e.g., expected normal operations within the 10 GHz range). In some variations, multiple track and hold components 323 can be placed in sequence of each other between selector switch 324 and the low-speed ADC 322 in order to achieve a faster signal tracking window. The paused signal (or held signal) from track and hold component 323 can be provided to low-speed ADC 322 for sampling. Low-speed ADC can have a sampling rate that is comparatively lower than that of ADC 337 (e.g., 1 Msps compared to 125-250 Msps). Low-speed ADC 322 can have a high resolution (e.g., at or greater than 12 bits) so as to ensure the signal is sampled with high fidelity.

The converted sample can be added into a register of the SPI interface 321 that is then available for controller 110 to shift out over the SPI interface. The raw PAM-5 symbols from transceiver 330, either via input to PAM-5 decoder 332 or output of PAM-5 encoder 333, can be provided to symbol FIFO component 327. These PAM-5 symbols can be captured at a time that matches a time when the signal is captured by track and hold component 323. Symbol FIFO 327 can be used to buffer the raw PAM-5 symbols from transceiver 330. Sequencer 325 can trigger each of the other components of fingerprint module 120 (e.g., track and hold components 323, selector switch 324, low-speed ADC 322, and symbol FIFO component 327) to operate at precisely the right moments. In order to achieve a high effective sample rate, the track and hold components 323 can be triggered at a very specific point that is a controllable fraction (phase) of the recovered clock. Fine delay component 326 of the sequencer 325 determines the effective statistical sample rate of the system 300, by delaying the recovered clock from timing recovery 331 by a fraction of the nominal clock rate. For example, if the delay can achieve approximately 256 taps (e.g., fractions) on a 125 MHz recovered clock from timing recovery component 331, an effective sample rate of approximately 32 Gsps for sequencer 325 can be achieved. In this example, approximately 10 GHz of a signal from the track and hold component 323 can be captured.

Figure 4:
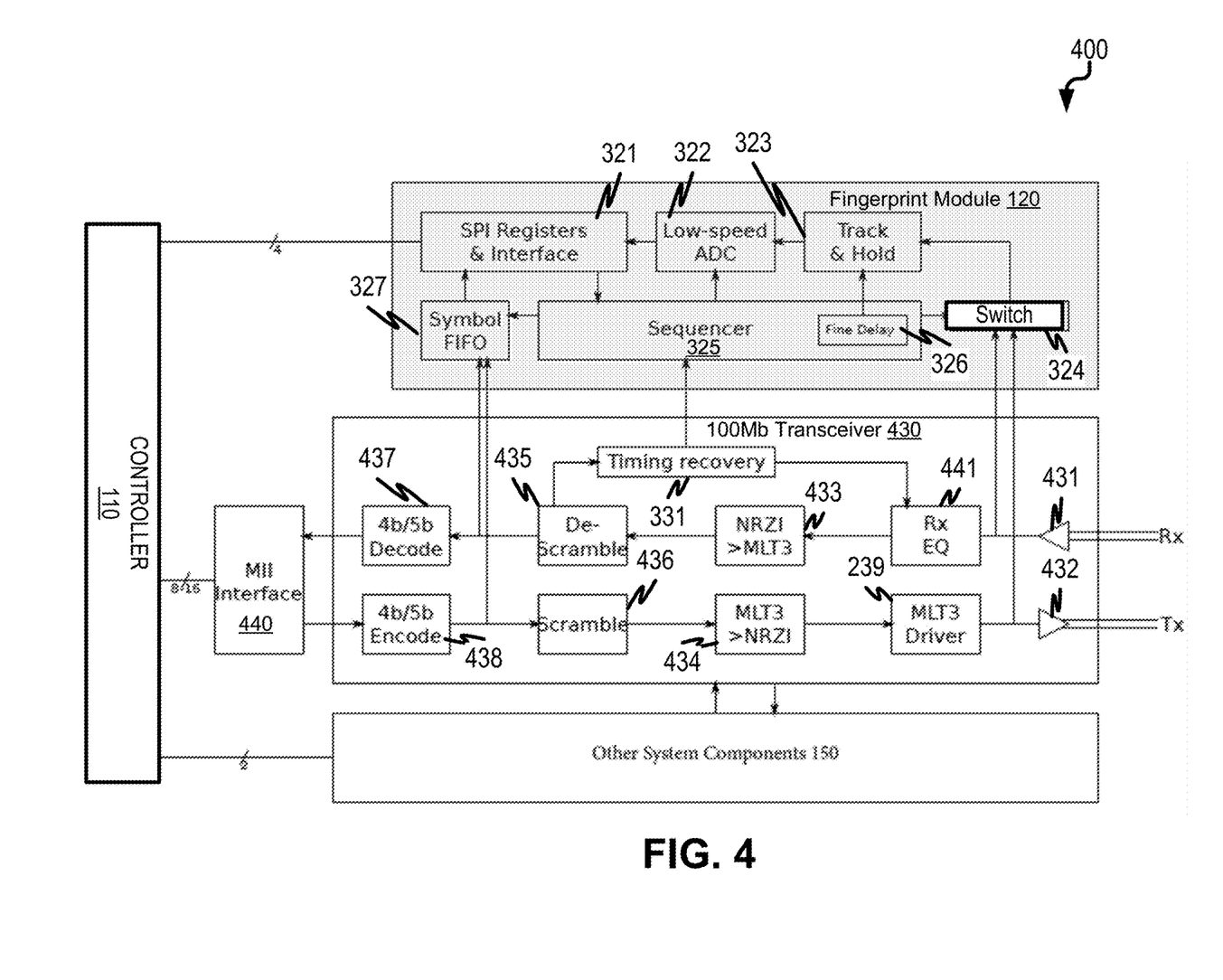
FIG. 4 is a system diagram illustrating another example logical system architecture for signal fingerprinting of a 100 Mb transceiver.

FIG. 4 is a system diagram illustrating another example logical system architecture 400 for signal fingerprinting of a 100 Mb transceiver. In this example, transceiver 130 can be a 100 Mb transceiver 430. Transceiver 430 can include amplifiers 431, 432, receive components Rx EQ 441, modulators 433, 434, de-scramblers 435, 436, 4B5B decoder 437, and 4B5B encoder 438. Modulators 433, 434 can be data modulators such as Non-Return-to-Zero-Inverted (NRZI) and Multi-Level transmit (MLT-3). Transceiver 430 can interface with controller 110 via MII interface 440. Similar to the 1 Gb transceiver 330 of FIG. 3, transceiver 430 can be coupled to transceiver 430. In this example, transceiver 430 receives data input signals and passes them through amplifier 431. The output of amplifier 431 and input to amplifier 432 can be provided to a selector switch 324 (e.g., a 2:1 switch in the example of a 100 Mb transceiver 430). Similarly, data in the form of 4B5B encoded data (e.g., 5 bit data mapped from 4 bit input) can be provided to symbol FIFO component 327. It is noted that fingerprint module 120 operates in a similar matter regardless of the transceiver 130 it is coupled to. The selector switch 324 is a modifiable switch that can be dependent upon the type of transceiver within a given system (e.g., 10 Mb transceiver, 100 Mb transceiver, 1 Gb transceiver).

Figure 5:
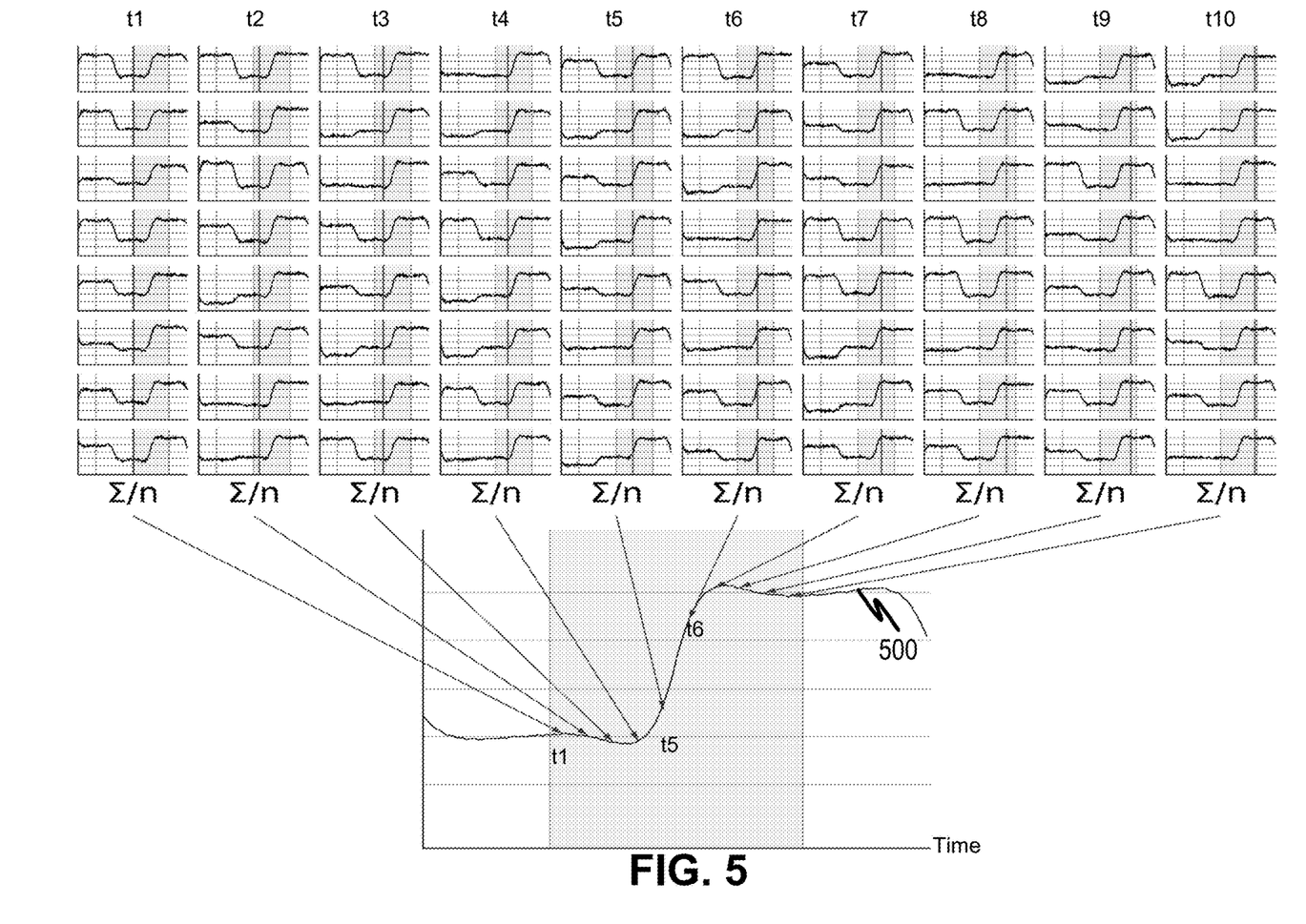
FIG. 5 is a series of random time point sample plots used to generate an example waveform fingerprint.

FIG. 5 is a series of random time point sample plots used to generate an example waveform fingerprint 500. The x-axis of the plot illustrating signal fingerprint 500 can be represented in units of time. The y-axis of the plot illustrating signal fingerprint 500 can be a unit of signal measurement, in this example voltage. Signal fingerprint 500 can be generated using fingerprint module 120 described in FIGS. 2-3. Although not explicitly described in relation to FIG. 4, the following algorithm can be applied for any number of signal inputs to generate a signal fingerprint.

As previously described in FIG. 3, selector switch 324 controls the sending of one signal from transceiver 330. Each signal transmitted from hybrid component 342 can be sequentially selected by the selector switch 324. Independently for each such signal, a temporal snapshot (e.g., an instantaneous voltage component of the waveform for a particular point-in-time) can be captured by the track and hold component 323 in conjunction with the low-speed ADC 322, generating a plurality of temporal snapshots for that signal. Sequencer 325 can be configured via SPI registers 321 to correlate snapshots for a given signal level transition (e.g. in FIG. 5, the y-axis has gradients for signal levels 1 through 5, and the transition being captured is from level 2 to level 5). One of sequencer 325 or controller 110 can cause the delays (as per fine delay 326), for each possible signal transition (1→2, 1→3, 1→4, 1→5, 2→1, 2→3, 2→4, 2→5, 3→1, etc.) for each of the input signals Rx and Tx A, B, C, and D. The plurality of the temporal samples for each time delay (e.g., 256 steps as per fine delay 326), resulting in a complete averaged waveform for each combination. The plurality of waveforms for all combinations of signals (A, B, C, D) and transitions combine to form a fingerprint. The combined fingerprint can be either a baseline fingerprint or a real-time fingerprint used to determine potential anomalous system activity.

Figure 6:
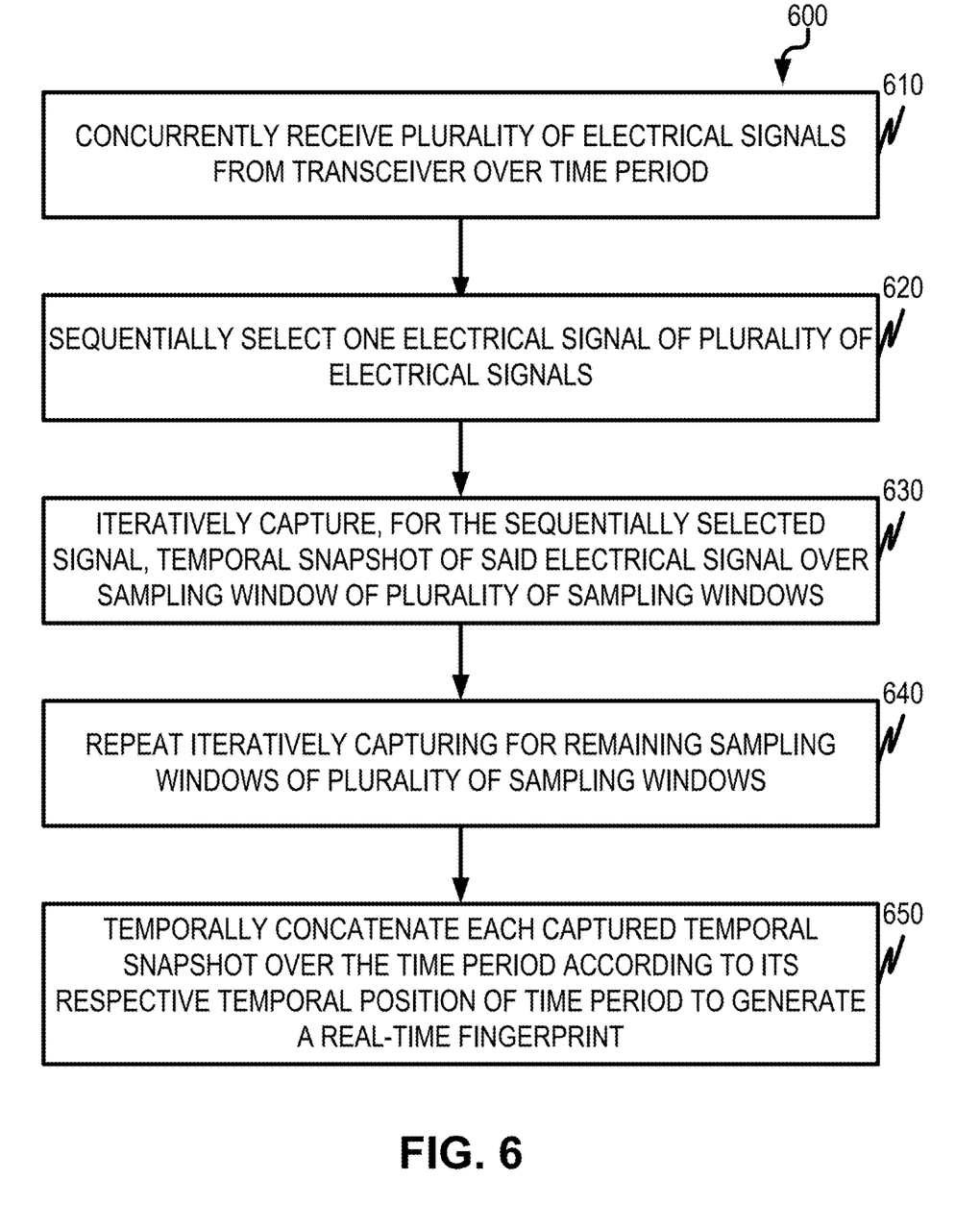
FIG. 6 is an example process flow diagram for generating a signal fingerprint.

FIG. 6 is an example process flow diagram 600 for generating a signal fingerprint such as an Ethernet fingerprint. Selector switch 324 can concurrently receive, at 610, a plurality of electrical signals from a transceiver 330 over a time period. The time period can be partitioned into a plurality of sampling windows (e.g., t1, t2, t3, t4, t5, t6, t7, t8, t9, t10). Selector switch 324 can sequentially select, at 620, one electrical signal of the plurality of electrical signals, one at a time to provide to track and hold component 323 (e.g., an amplifier). Track and hold component 323 can iteratively capture, at 630, for the one sequentially selected electrical signal, a temporal snapshot of that electrical signal over one of the sampling windows. For each sampling window within the time period, the iterative capturing can be repeated, at 640, for the entire time period (e.g., for all sampling windows t1, t2, t3, t4, t5, t6, t7, t8, t9, t10). Signal fingerprint 500 of transceiver 330, 430 can be generated, at 650, by temporally concatenating each of the captured temporal snapshots over the time period according to its respective temporal position within the time period.

During an imprint mode, fingerprint module 120 can generate a baseline fingerprint of the transmitting node on the bus of system 100. During a monitoring mode, fingerprint module 120 can monitor the operation of transceiver 330, 430 by generating real-time fingerprints of transceiver 330, 430 as described in FIGS. 4-5. Fingerprint module 120 can identify a signal difference between a real-time fingerprint generated during monitoring and a predetermined fingerprint such as a baseline fingerprint generated during imprint mode. In some variations, the signal difference can be compared to an error threshold configured within fingerprint module 120. If the signal difference is outside of the error threshold, an abnormality in the system (e.g., system 300, 400) can be identified. An abnormality can be remedied in a variety of different various such as, but not limited to, alerting a user of the system through a graphical user interface, implementing a firewall rule blocking the transceiver 330, 430 from allowing the system to continue to operate, and/or disabling one or more interfaces to the transceiver 330, 430. In some variations, the firewall rule can apply to selector switch 324.

Figure 7A:
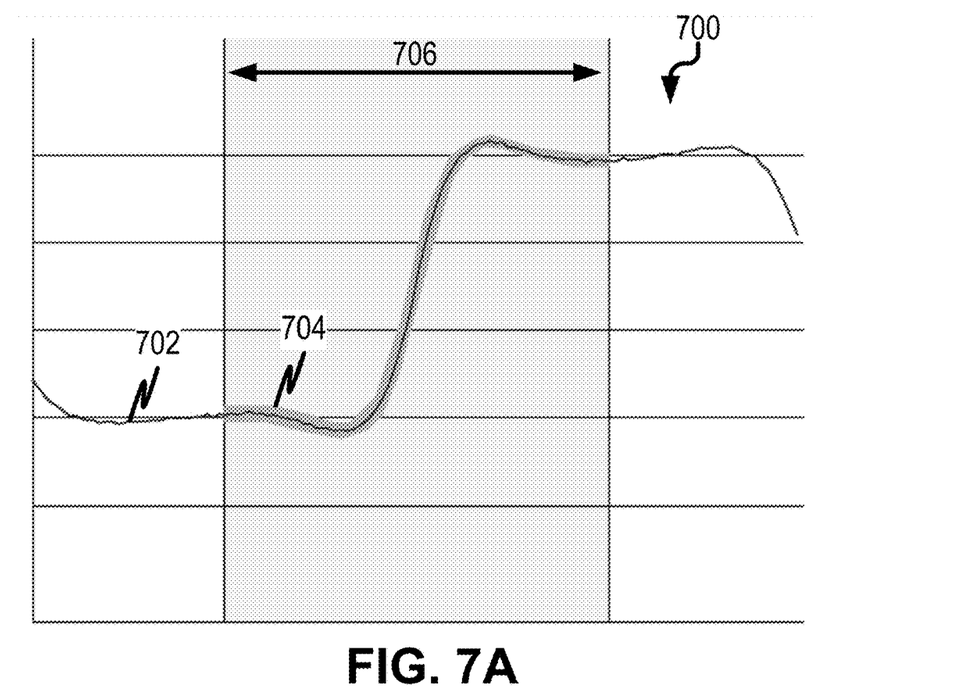
FIG. 7A is a plot illustrating an example real-time signal fingerprint having no offset from a baseline fingerprint.

FIG. 7A is a plot 700 illustrating an example real-time signal fingerprint having no offset from a baseline fingerprint. For example, plot line 702 represents a baseline signal fingerprint generated during imprint mode. Plot line 704 represents a real-time, generated signal fingerprint using the method described in FIG. 6. Error or deviation range 706 defines an acceptable range over which a real-time signal fingerprint generated using the method described in FIG. 6 (e.g., plot line 704) can deviate from a baseline or expected signal fingerprint (e.g., plot line 702). As illustrated in FIG. 7A, there is minimal to no signal difference between the baseline signal fingerprint (e.g., plot line 702) and the real-time signal fingerprint (e.g., plot line 704). As a result, the system being monitored resulting in plot 700 likely contains no abnormalities.

Figure 7B:
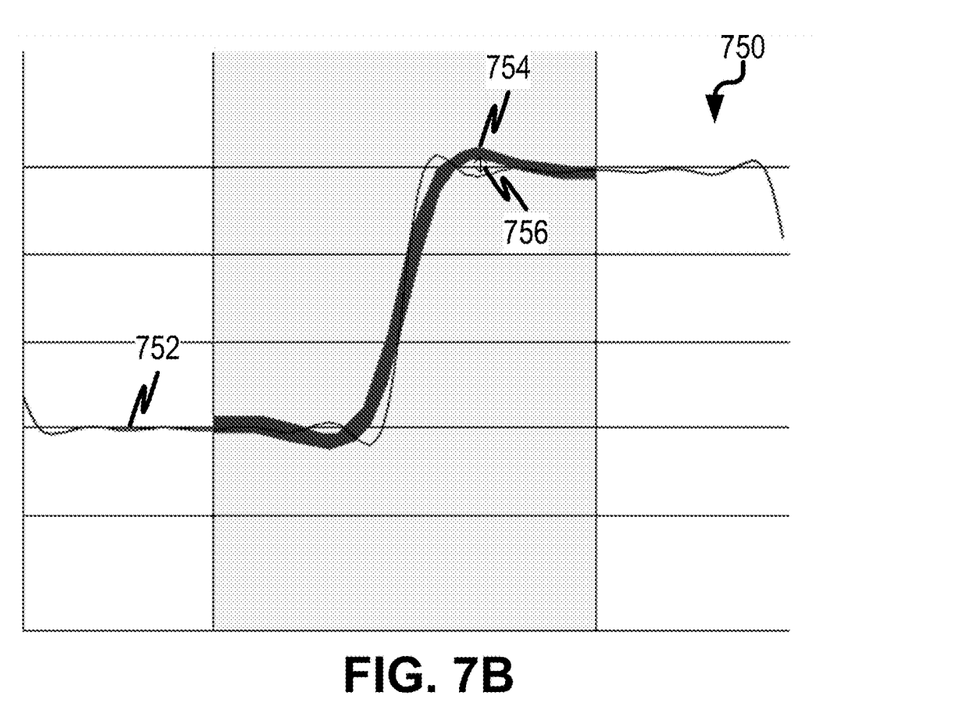
FIG. 7B is a plot illustrating an example real-time signal fingerprint having an offset from a baseline fingerprint.

FIG. 7B is a plot 750 illustrating an example real-time signal fingerprint having an offset from a baseline fingerprint. For example, plot line 752 represents a baseline signal fingerprint generated during an imprint mode. Plot line 754 represents a real-time signal fingerprint generated during monitoring mode. As illustrated in FIG. 7B, there is a signal difference 756 between the real-time signal fingerprint and the baseline signal fingerprint. If this delta is outside an error threshold window defined by the system, an abnormality in the system can be identified by fingerprint module 120. Fingerprint module 120 can communicate this anomaly to controller 110. Controller 110 can, in turn, remedy the anomaly in various ways by alerting a user of the system through a graphical user interface, implementing a firewall rule blocking the transceiver from further operation with the system, or disabling one or more interfaces to the transceiver.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more data processors forming one or more computing devices, the method comprising:
concurrently receiving a plurality of electrical signals, by a fingerprint module, from a transceiver over a time period, wherein the time period is partitioned into a plurality of sampling windows, wherein the fingerprint module comprises:
a switch coupled to the transceiver, the switch configured to receive the plurality of electrical signals and select one electrical signal of the plurality of electrical signals;
a track and hold component coupled to the switch, the track and hold component configured to receive the selected electrical signal and pause said selected electrical signal in time;
a converter coupled to the track and hold component and a sequencer, the converter configured to sample the selected electrical signal;
a serial peripheral interface (SPI) coupled to the sequencer and the converter, the SPI configured to transmit the sampled electrical signal; and
the sequencer coupled to the transceiver, the track and hold component, and the switch, the sequencer configured to trigger each of the track and hold component and the converter to operate at a moment in time;
sequentially selecting an electrical signal of the plurality of electrical signals;
iteratively capturing, for the sequentially selected electrical signal, a temporal snapshot of said electrical signal over a sampling window of the plurality of sampling windows;
repeating the iteratively capturing for remaining sampling windows of the plurality of sampling windows; and
temporally concatenating each captured temporal snapshot over the time period according to its respective temporal position of the time period to generate a real-time fingerprint.

2. The method of claim 1, further comprising identifying, by at least one data processor, a signal difference between the real-time fingerprint and a predetermined fingerprint of the transceiver.

3. The method of claim 2, further comprising:
comparing, by at least one data processor, the signal difference to a predetermined error threshold; and
identifying, by at least one data processor, an abnormality in a system comprising the transceiver when the signal difference is outside of the predetermined error threshold.

4. The method of claim 3, further comprising remedying, by at least one data processor, the abnormality by alerting a user of the system through a message displayed on a graphical user interface.

5. The method of claim 3, further comprising remedying, by at least one data processor, the abnormality by implementing a firewall rule that blocks the transceiver from further communication with the system.

6. The method of claim 5, wherein the firewall rule prohibits communication by the transceiver with a component of the system.

7. The method of claim 3, further comprising remedying, by at least one data processor, the abnormality by disabling one or more interfaces to the transceiver to prohibit communication between the transceiver and components of the system.

8. The method of claim 3, wherein the real-time fingerprint characterizes components of the system electrically coupled to the transceiver, the components including at least one of a data cable coupled to the transceiver, one or more data processors coupled to the transceiver, or one or more electrical cables.

9. The method of claim 1, wherein the transceiver is at least one of a 10 megabit (Mb) Ethernet transceiver, 100 Mb Ethernet transceiver, or 1 gigabit (Gb) Ethernet transceiver.

10. The method of claim 1, wherein the plurality of electrical signals comprise a plurality of voltage signals.

11. A system comprising:
a transceiver configured to receive data from a communications bus and generate a plurality of electrical signals representing the data;
a fingerprint module coupled to the transceiver, the fingerprint module configured to receive the plurality of electrical signals and generate a real-time fingerprint of components coupled to the communications bus, wherein the fingerprint module comprises:

a switch coupled to the transceiver, the switch configured to receive the plurality of electrical signals and select one electrical signal of the plurality of electrical signals;
a track and hold component coupled to the switch, the track and hold component configured to receive the selected electrical signal and pause said selected electrical signal in time;
a converter coupled to the track and hold component and a sequencer, the converter configured to sample the selected electrical signal;
a serial peripheral interface (SPI) coupled to the sequencer and the converter, the SPI configured to transmit the sampled electrical signal; and
the sequencer coupled to the transceiver, the track and hold component, and the switch, the sequencer configured to trigger each of the track and hold component and the converter to operate at a moment in time; and
a memory device coupled to the fingerprint module, the memory device configured to store a baseline fingerprint of the components coupled to the communications bus for comparison with the real-time fingerprint.

12. The system of claim 11, wherein the fingerprint module generates the real-time fingerprint by:
concurrently receiving a plurality of electrical signals from a transceiver over a time period, wherein the time period is partitioned into a plurality of sampling windows;
sequentially selecting an electrical signal of the plurality of electrical signals;
iteratively capturing, for the sequentially selected electrical signal, a temporal snapshot of said electrical signal over a sampling window of the plurality of sampling windows;
repeating the iteratively capturing for remaining sampling windows of the plurality of sampling windows; and
temporally concatenating each captured temporal snapshot over the time period according to its respective temporal position of the time period to generate the real-time fingerprint.

13. The system of claim 11, further comprising:
a controller comprising the memory device; and
a controller interface coupled between the controller and the transceiver, the controller interface configured to facilitate data transmission between the transceiver and the controller in a compatible data format.

14. The system of claim 11, wherein the transceiver is at least one of a 10 megabit (Mb) Ethernet transceiver, 100 Mb Ethernet transceiver, or 1 gigabit (Gb) Ethernet transceiver.

15. The system of claim 11, wherein the plurality of electrical signals comprise a plurality of voltage signals.

16. A system comprising:
a communications bus configured to transmit data;
a first abnormality detection system coupled to the communications bus, the first abnormality detection system configured to provide data to the communications bus; and
a second abnormality detection system coupled to the communications bus, the second abnormality detection system configured to monitor the first abnormality detection system for system abnormalities by generating a real-time fingerprint of the first abnormality detection system and comparing the real-time fingerprint to a baseline fingerprint associated with the first abnormality detection system, wherein the second abnormality detection system comprises:
a fingerprint module coupled to a transceiver, the fingerprint module configured to receive the plurality of electrical signals and generate a real-time fingerprint of components coupled to the communications bus, wherein the fingerprint module comprises:
a switch coupled to the transceiver, the switch configured to receive the plurality of electrical signals and select one electrical signal of the plurality of electrical signals;
a track and hold component coupled to the switch, the track and hold component configured to receive the selected electrical signal and pause said selected electrical signal in time;
a converter coupled to the track and hold component and a sequencer, the converter configured to sample the selected electrical signal;
a serial peripheral interface (SPI) coupled to the sequencer and the converter, the SPI configured to transmit the sampled electrical signal; and
the sequencer coupled to the transceiver, the track and hold component, and the switch, the sequencer configured to trigger each of the track and hold component and the converter to operate at a moment in time.

17. The system of claim 16, wherein the second abnormality detection system generates the real-time fingerprint by:
concurrently receiving a plurality of electrical signals from a transceiver over a time period, wherein the time period is partitioned into a plurality of sampling windows;
sequentially selecting an electrical signal of the plurality of electrical signals;
iteratively capturing, for the sequentially selected electrical signal, a temporal snapshot of said electrical signal over a sampling window of the plurality of sampling windows;
repeating the iteratively capturing for remaining sampling windows of the plurality of sampling windows; and
temporally concatenating each captured temporal snapshot over the time period according to its respective temporal position of the time period to generate the real-time fingerprint.

18. The system of claim 17, wherein the transceiver is at least one of a 10 megabit (Mb) Ethernet transceiver, 100 Mb Ethernet transceiver, or 1 gigabit (Gb) Ethernet transceiver.

19. The system of claim 16, wherein the second abnormality detection system comprises:
a transceiver configured to receive data from a communications bus and generate a plurality of electrical signals representing the data;
a memory device coupled to the fingerprint module, the memory device configured to store a baseline fingerprint of the components coupled to the communications bus for comparison with the real-time fingerprint.

20. The system of claim 16, wherein the plurality of electrical signals comprise a plurality of voltage signals.

* * * * *